Oct. 20, 1953     L. F. SAMLER     2,656,048
APPARATUS FOR LOADING AND UNLOADING LAMINATING PRESSES
Filed June 22, 1951     2 Sheets-Sheet 1
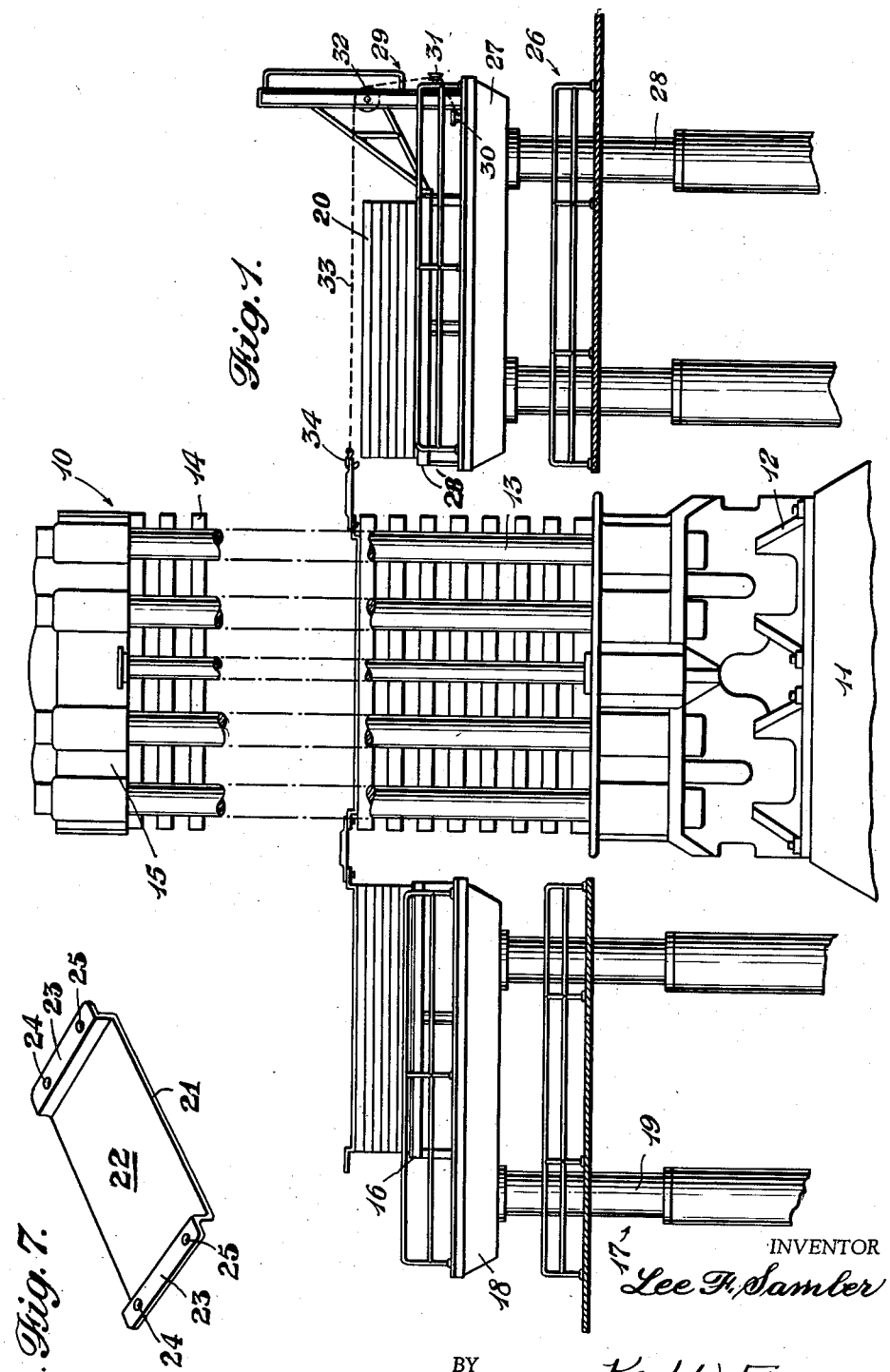
INVENTOR
Lee F. Samler
BY
Karl W. Flocks
ATTORNEY Oct. 20, 1953 L. F. SAMLER 2,656,048
APPARATUS FOR LOADING AND UNLOADING LAMINATING PRESSES
Filed June 22, 1951 2 Sheets-Sheet 2
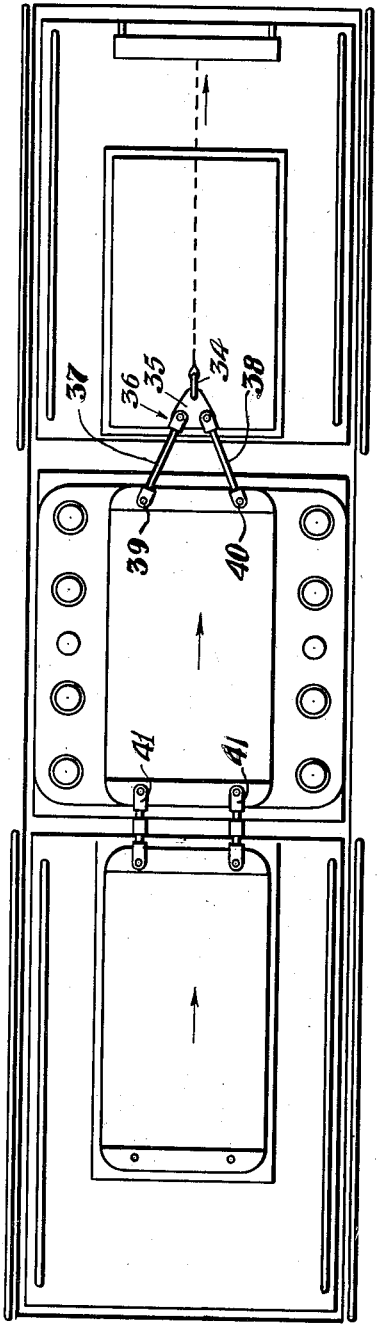
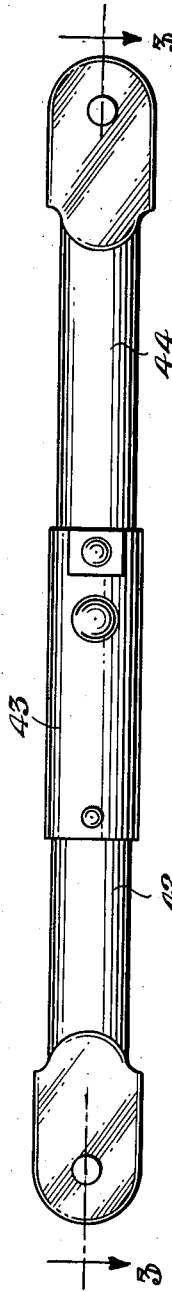
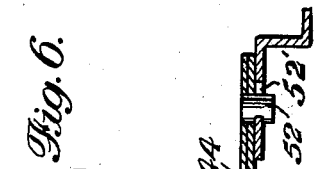
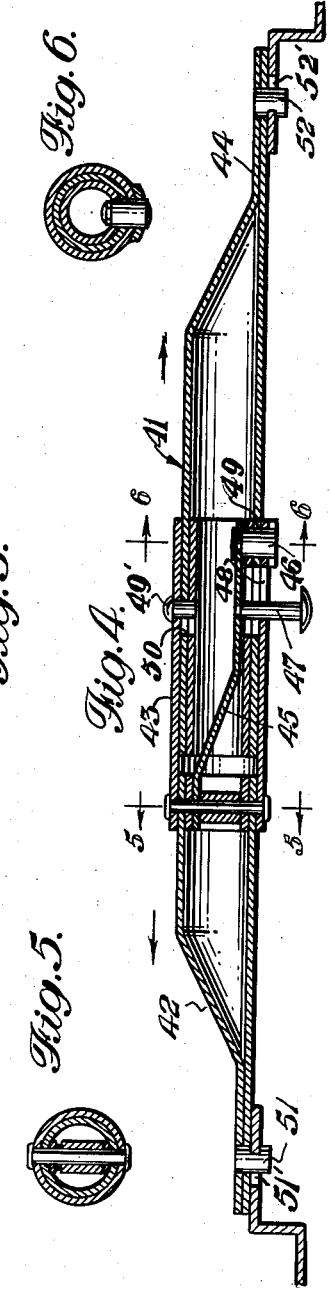
INVENTOR
Lee F. Samler
BY Karl W. Flocks
ATTORNEY

Patented Oct. 20, 1953

2,656,048

UNITED STATES PATENT OFFICE

2,656,048

APPARATUS FOR LOADING AND UNLOADING LAMINATING PRESSES

Lee F. Samler, Baltimore, Md., assignor to The National Plastic Products Company, Odenton, Md., a corporation of Maryland Application June 22, 1951, Serial No. 233,087

4 Claims. (Cl. 214—1)

This invention relates to material handling methods and apparatus, and more particularly to a method for loading and unloading a press and apparatus for accomplishing the same.

Laminated sheet material is manufactured by subjecting layers of paper, cardboard or fabric impregnated with phenolic melamine and other resins to high pressure and temperature. It is common to employ presses for this purpose which have a plurality of platens arranged in tiers so that as many laminated sheets may be simultaneously produced as there are spaces between platens in the press. For most purposes it is essential that at least one surface of the finished lamination be perfectly smooth and glossy in appearance. To obtain this finish, the impregnated layers of paper or fabric are arranged on highly polished thin plates of metal and placed between the platens of the press.

It is the present practice to load the platens of the press with impregnated layers of paper or fabric on metal plates by hand. Great difficulties are experienced because of the tendency of the layers during handling to shift in position relative to each other and relative to the metal plate. The layers and plates must also be carefully positioned on the platens at the expense of considerable time and physical effort.

The manual unloading of a press is particularly onerous and time consuming by reason of the hot condition of the finished laminations in addition to the continuous hot condition of the press itself. Heavy asbestos gloves must be worn by the workmen and frequent injury to the finished laminations result from the difficulty of handling them. The manual method of loading and unloading a press takes an inordinate amount of time and seriously limits the productivity of a plant involving a large capital investment and consequent high overhead charge. It is, therefore, the general object of this invention to provide a powered mechanical apparatus for loading and unloading a press.

It is another object to provide a relatively low cost apparatus which is particularly adapted for high-speed loading and unloading of a press having a plurality of platens arranged in tiers.

It is a further object to provide a press loading apparatus operative to accurately position the layers and metal sheets on the platens of the press.

It is a further object to provide a method for simultaneously loading and unloading the platens of a press.

It is a further object to provide press loading and unloading apparatus adapted to simultaneously load and unload the platens of a press.

It is a further object to provide a novel polished pull plate for use in pressing resin-impregnated laminated sheets.

It is a further object to provide a readily releasable linkage arm for use in simultaneously loading and unloading a multi-platen press.

It is a further object to provide a press loading and unloading apparatus which is easy to control and may be operated by unskilled workmen.

It is a further object to provide an apparatus which is relatively inexpensive to install and operate.

In pursuance of these and other objects which will be apparent to those skilled in the art, a loading elevator is provided on one side of the press, an unloading elevator on the other side of the press and winch means on the side of the unloading elevator opposite from the press. The winch means includes a drum, a guide roller, a winch cable engaged with the drum and trainable over the guide roller, and a Y-shaped link on the free end of the cable. The loading elevator is receptive to a sandwich stack of lamination layers and metal plates provided with ears. In use, the loading elevator is successively positioned so that the Y-shaped link may be engaged with the ears of the metal plates and the winch employed to draw each of the layer and plate assemblies onto a different platen of the press.

After the press has once been loaded and the pressure applied, the unloading and loading elevators are successively positioned so that the Y-shaped link may be engaged with the ears of the metal plates on the press platen and another set of readily releasable linkage arms may be engaged between the ears of the plates on the press platen and the ears of the top plate on the loading elevator. Thus, when the completed load is withdrawn from the press, a fresh load is simultaneously loaded into the press.

Other objects and the nature and advantages of the instant invention will be apparent from the following description taken in conjunction with the accompanying drawings, wherein:

Figure 1 is a side elevation of the entire apparatus illustrating the simultaneous press unloading and loading operation.

Fig. 2 is a top plan view of the apparatus.

Fig. 3 is a bottom plan view of the linkage arm.

Fig. 4 is a section of the linkage arm along the line 4—4 of Fig. 3 showing the linkage arm attached to the ears of the plates.

Fig. 5 is a section taken along the line 5—5 of Fig. 4.

Fig. 6 is a section taken along the line 6—6 of Fig. 4; and

Fig. 7 is a perspective view of the metal plate.

Referring now in greater detail to the drawings, a hydraulic press, generally designated 10, is mounted on a suitable foundation 11 and includes a base 12, vertical guide members 13, a plurality of platens 14 arranged in vertical tiers and a vertically reciprocable ram 15. A loading elevator generally designated 17 including an elevator platform 18 is mounted for vertical reciprocation on a pair of pistons 19. The loading elevator platform 18 is provided with a table 16 receptive to a sandwich stack of alternately arranged resin impregnated layers 20 of paper or fabric and polished metal plates 21. The upper side 22 of each metal plate 21 is highly polished to insure a smooth finish on the contiguous surface of the lamination. As shown to advantage in Fig. 7, the metal plates 21 are provided with side walls at opposite ends thereof, each side wall having offset ears 23 extending outwardly therefrom. Each ear 23 is provided with spaced apart apertures 24 and 25 for reasons which will be hereinafter set forth. An unloading elevator, generally designated 26, having a platform 27 is mounted for vertical reciprocation on a pair of pistons 28. The unloading elevator 26 is located beside the press 10 on the side opposite the loading elevator 17. Like the loading elevator 17, the unloading elevator 26 is receptive to a table 28' adapted to receive the stack of pressed laminates. The elevators 17 and 26 may be of any conventional type having control means for moving the platforms to any desired level.

Winch means generally designated 29 is mounted on the unloading elevator platform 27 on the side opposite from the press 10. Thus the winch means is adapted to travel with the unloading elevator and is always in aproximately correct alignment. The winch means 29 includes a cable drum 30, idler pulley 31, and a guide roller or pulley 32. Means not shown are provided for making minor adjustments in the height of guide pulley 32 from the platform 27. Alternatively, a plurality of guide pulleys 32 can be provided. The winch means 29 also includes a winch cable or rope 33 looped around the winch drum 30, trained around idler pulley 31 and over the guide pulley 32. The end of the cable or rope 33 is engaged with a hook 34.

As shown in Fig. 2, the hook 34 is engaged with the apertured leg 35 of a Y-shaped (or V-shaped) link 36. The ends of the arms 37 and 38 of the link 36 are provided with hook pins 39 and 40 adapted to enter the apertures 24 and 25 in the ears 23 of metal plates 21. Link 36 is employed for unloading the lamination-carrying metal plates 21 from the press onto the unloading elevator 26.

It is apparent that the elements of apparatus are so arranged that the winch cable or rope 33 is on the common center line of the unloading elevator 26, the press 10 and the loading elevator 17. It is also apparent that, by the use of Y-shaped link 36, the lamination-carrying metal plates 21 may be drawn by the winch means 29 in a straight line without danger of the plates 21 becoming skewed in position at any time.

A pair of readily releasable linkage arms 41 are used to connect the metal plate 21 which is ready for removal from a press platen 14 with the topmost metal plate 21 on the stack on the loading elevator 17 so that the two plates can be moved simultaneously. The linkage arms 41 include a hollow member 42 to one end of which is attached a sleeve 43 which extends beyond member 42. A second hollow member 44 is adapted to telescope within the sleeve 43 and reciprocate therein. A spring member 45 which is housed within sleeve 43 is rigidly attached at one end to the member 42 and at the other end is provided with a latch 46. A releasing button 47 is attached to an intermediate portion of the spring member 45. The releasing button 47 extends through aligned slots 48 in the sleeve 43 and the member 44. The latch 46 is spring actuated to fit into aligned holes 49 in the sleeve 43 and member 44 to retain the two members in position. When the releasing button 47 is pushed upwardly against the action of the spring member 45, the spring member 45 and latch 46 are raised out of the holes 49 thereby releasing member 44 to permit reciprocation within the sleeve 43 to the extent of the slots 48. A guide pin 49' extends downwardly from the sleeve 43 at a point opposite from slot 48. Guide pin 49' is adapted to travel in a slot 50 in the member 44. At the extreme ends of each linkage arm 41 are located downwardly extending hook pins 51 and 52 adapted to enter the apertures 24 and 25 in the ears 23 of metal plates 21. A slot 51', 52' is provided on the inner side of each hook pin adapted to receive the ears 23 of the metal plates when pressure is applied.

In the operation of the apparatus, the platform 18 of the loading elevator 17 is first loaded with a sandwich stack of alternately arranged resin-impregnated layers and polished metal plates 21. The height of the elevator is then adjusted until the top lamination-carrying metal plate 21 is level with one of the platens 14 of the press 10. The hook pins 39 and 40 of the Y-shaped link 36 are engaged with the apertures 24 and 25 in the inner ear 23 of the top metal plate 21, and the winch cable is retracted until the top lamination-carrying metal plate 21 is drawn from the loading elevator 17 to a centered position on the platen 14 of press 10. The elevator 17 is then moved until the top lamination-carrying metal plate is on a level with another platen 14 of press 10. The process is thus repeated until a lamination-carrying metal plate 22 has been drawn onto each one of the platens 14.

The ram 15 of the press 10 is then lowered or raised and the required heat and pressure is applied until the layers of resin-impregnated paper or fabric are properly fused. As the ram 15 is raised or lowered, the platens 14 assume their normal spacing as shown in the drawings.

The loading elevator 17 is next reloaded with a stack of layers and plates and is then raised until the lamination-carrying metal plate is level with one of the platens 14 of the press 10. The unloading elevator 26 is likewise raised to be on a level with the same platen 14 of the press. The Y-shaped link 36 is engaged with the apertures 24 and 25 in the ear of the metal plate on the platen adjacent to the unloading elevator. The readily released linkage arms 41 are connected between the ears of the metal plate on the platen adjacent to the loading elevator and the inner ears of the top metal plate on the loading elevator. The winch cable is then retracted so that the metal plate on the platen is removed from the platen onto the unloading elevator and simultaneously the top metal plate on the loading elevator is drawn onto the platen in position for the next pressing operation. The Y-shaped links 36 can be readily detached by adjustment of the winch cable. The linkage arms 41 are readily released by pressing on the button 47 to remove the latch 46 from the holes 49 and thus release the pressure remaining on the linkage arms and allowing the linkage arms to extend in length by relative movement of the member 44 and the sleeve 43. The hook pins 51 and 52 can then be readily removed from the apertures 24 and 25 in the ears 23 of the adjacent metal plates 21.

The elevators are then repositioned so that the top metal plates thereon are each flush with another platen of the press. The Y-shaped links and linkage arms are again attached to the ears of the plates and the platen is simultaneously unloaded and loaded. This process is repeated until all of the lamination-carrying plates 21 have been removed from the press 10 and arranged in a neat stack on the unloading elevator and the platens of the press have been simultaneously reloaded with lamination-carrying plates in proper position for the subsequent pressing operation.

If necessary, separating members may be positioned beneath each metal plate in the stack to prevent the movement of successive plates as the topmost plate is pulled into the press.

It will be obvious to those skilled in the art that various changes may be made without departing from the spirit of the invention and therefore the invention is not limited to what is shown in the drawings and described in the specification but only as indicated in the appended claims.

What is claimed is:

1. Apparatus for loading and unloading a sandwich stack of material sheets on polished metal plates into and out of a press having a plurality of platens arranged in tiers, comprising a loading elevator on one side of the press receptive to the sandwich stack and operative to successively position the top sheet of the stack on a level with a platen of the press, an unloading elevator on the opposite side of the press operative to be successively positioned to receive the pressed sheets from each platen, winch means positioned on the unloading elevator including a winch cable, a Y-shaped link secured to the end of the winch cable, hook pins on the ends of the arms of the link, a pair of linkage arms, hook pins on the two ends of said linkage arms, said sheet material lamination carrying plates having spaced apertures along opposite edges thereof, the apertures being receptive to said hook pins on said Y-shaped link and said linkage arms, whereby when said Y-shaped link is attached to a carrying plate on a platen of the press and said linkage arms are attached so as to connect the other end of said carrying plate on said platen with an end of a carrying plate on said loading elevator, the platen may be simultaneously unloaded onto the unloading elevator and reloaded from the loading elevator by operation of said winch means.

2. Apparatus in accordance with claim 1, wherein said linkage arms include a pair of telescoping members adapted to reciprocate with respect to one another a given amount, means for locking said members into fixed relationship, and means for releasing said members from locked position to remove said linkage arms from the metal plates.

3. Apparatus for loading and unloading a press, comprising a loading elevator receiving layers of unworked material in vertical tiers thereon, an unloading elevator opposite said loading elevator receiving layers of worked material in vertical tiers thereon, winch means positioned on said unloading elevator, link means comprising linkage arms adapted to be secured to successive layers of said unworked material and to corresponding layers of said worked material, second link means comprising a Y-shaped link adapted to be secured to successive layers of said worked material and to said winch means, said winch means drawing successive layers of said worked material onto said second elevator while simultaneously drawing successive sheets of unworked material from said first elevator.

4. Apparatus for loading and unloading a press formed with a plurality of platens arranged in tiers, comprising a loading elevator located on one side of said press and adapted to receive thereon in successive tiers a stack of material to be worked, an unloading elevator located opposite said loading elevator and adapted to receive thereon in successive tiers a stack of worked material, means for adjusting said elevators so that the top of each stack of material is in line with the platen of the press being loaded, first link means adapted to be associated with successive tiers of said stack of material to be worked and to the corresponding tiers of said worked stack of material, second link means adapted to be associated with successive tiers of said worked material, and means associated with said second link means and positioned on said unloading elevator for drawing successive tiers of said worked material from said press and simultaneously drawing successive tiers of material to be worked into said press.

LEE F. SAMLER.

References Cited in the file of this patent

UNITED STATES PATENTS

| Number | Name | Date |
|---|---|---|
| 652,813 | Seiberling | July 3, 1900 |
| 1,020,261 | Campbell | Mar. 12, 1912 |
| 1,414,489 | Stiefel | May 2, 1922 |
| 1,550,907 | Lacke | Aug. 25, 1925 |
| 1,876,171 | Rosener | Sept. 6, 1932 |
| 2,072,667 | Coe | Mar. 2, 1937 |
| 2,126,652 | Mueller | Aug. 9, 1938 |
| 2,438,896 | Bowen et al. | Apr. 6, 1948 |
| 2,497,149 | Berdis | Feb. 14, 1950 |
| 2,524,599 | Philp | Oct. 3, 1950 |
| 2,544,743 | Vrabcak | Mar. 13, 1951 |

FOREIGN PATENTS

| Number | Country | Date |
|---|---|---|
| 433,778 | Great Britain | Aug. 15, 1935 |